United States Patent [19]

Stoops

[11] 4,039,220
[45] Aug. 2, 1977

[54] LATCH FOR HOISTING HOOK

[75] Inventor: Bobby G. Stoops, Tulsa, Okla.

[73] Assignee: Don R. Hinderliter, Inc., Tulsa, Okla.

[21] Appl. No.: 683,233

[22] Filed: May 4, 1976

[51] Int. Cl.² ............................................. B66C 1/36
[52] U.S. Cl. ............................. 294/82 R; 24/241 PP
[58] Field of Search ................ 294/78 R, 82 R, 83 R; 24/230.5 SA, 232, 241 R, 241 P, 241 PP, 241 PL, 241 PS, 241 SP, 241 SB, 241 SL

[56] References Cited

U.S. PATENT DOCUMENTS

| 1,272,705 | 7/1918 | Pearson | 24/241 PS |
| 1,313,368 | 8/1919 | Cesen | 24/232 UX |
| 1,324,676 | 12/1919 | Knudsen | 24/241 PS |
| 2,121,908 | 6/1938 | Ericksen | 24/241 SL |
| 2,514,656 | 7/1950 | Manson | 24/241 PP |
| 3,827,746 | 8/1974 | Byers | 294/82 R |

FOREIGN PATENT DOCUMENTS

| 1,932,802 | 2/1971 | Germany | 294/83 R |

Primary Examiner—Johnny D. Cherry
Attorney, Agent, or Firm—William S. Dorman

[57] ABSTRACT

A latching mechanism for a hoisting hook of the type having a C-shaped body portion with a stem at one end and a tip at an opposite end spaced from the stem to form a mouth, a longitudinally extending latch pivotally connected at one end to the stem for pivotal movement towards and away from the body portion about a horizontal pivot axis perpendicular to and spaced from the central axis of the stem, the tip having a recess means therein terminating in a stop means, the latch being provided with a projection means adjacent the opposite free end, whereby, when the latch is pivoted about its pivot axis away from the body portion, the projection means will pass into the recess means until it engages the stop means, constituting a closed position of the latch with respect to the hook, a spring means for urging the latch away from the body portion towards and into engagement with the tip, and rotatable locking means at the opposite end of the latch and selectively engagable with the upper end of the tip for retaining the latch in closed position with respect to the hook.

5 Claims, 13 Drawing Figures

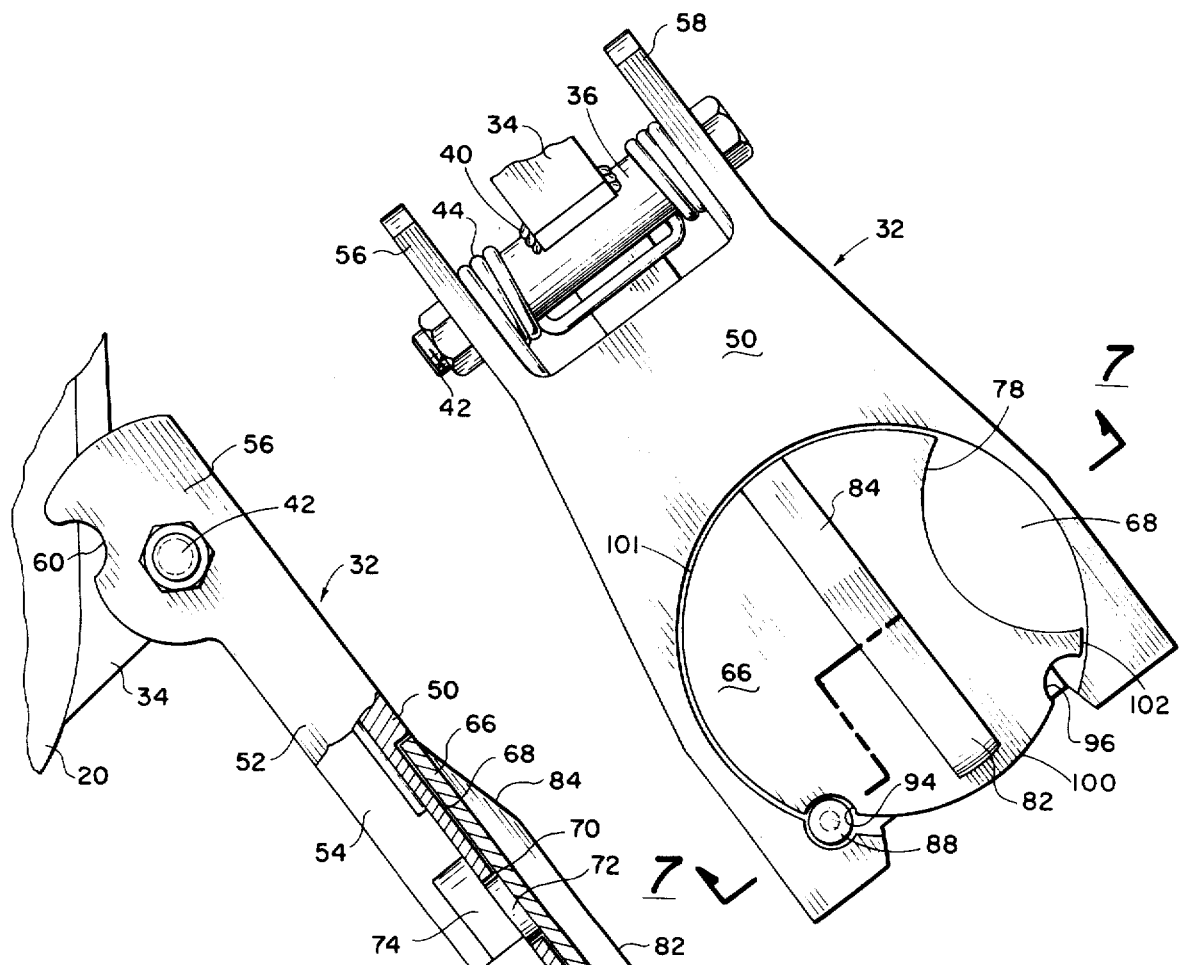
Fig. 5
Fig. 6
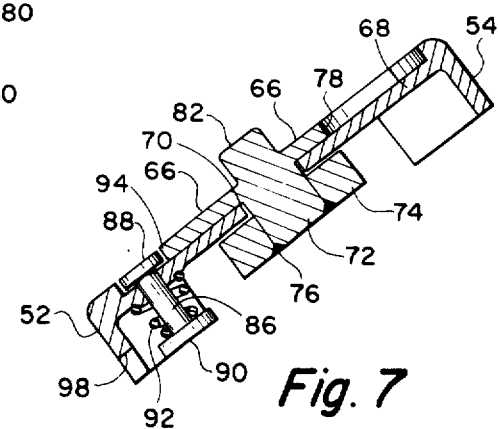
Fig. 7

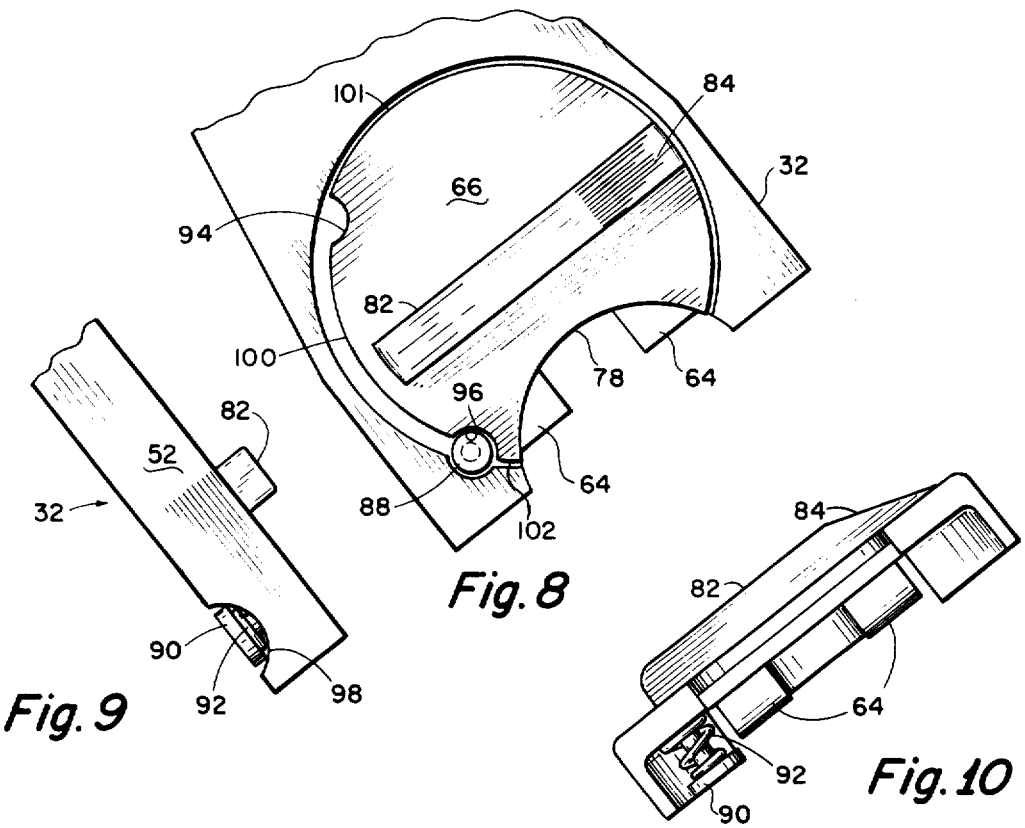
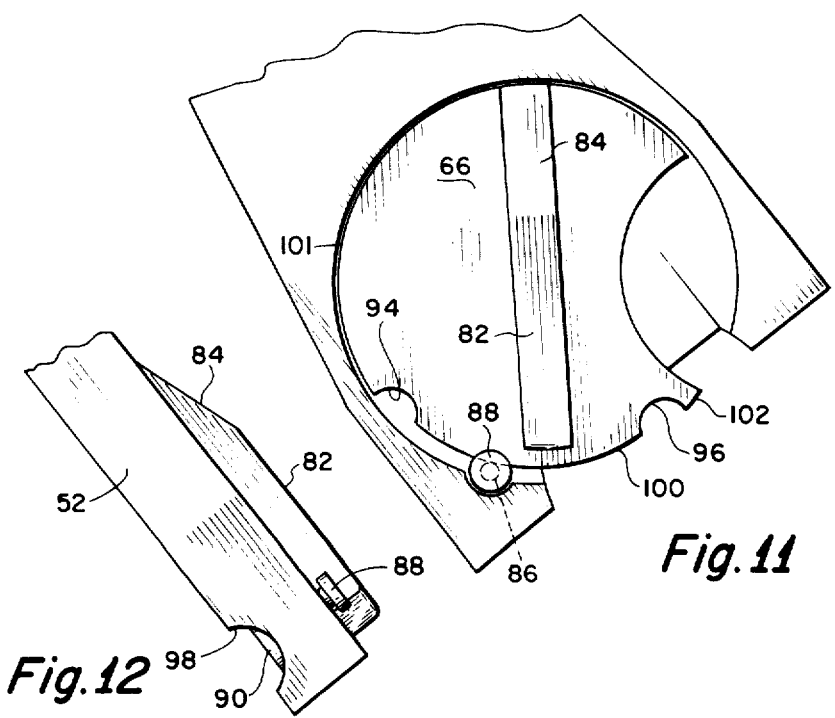

LATCH FOR HOISTING HOOK

BACKGROUND OF THE INVENTION

1. Field of the Invention

The present invention relates to a latch for a hoisting hook. More particularly, the present invention relates to a latch which will close over the mouth of the hook in a substantially straight line from the stem of the hook to the upper end of the tip and which, further, can be locked over the end of the tip.

2. Description of the Prior Art

Hoisting hooks have been provided with hook latches for closing the mouth of the hook. These hook latches are usually of two types: one is a gate type latch that pivots around the shank of the hook and is more practical and economically feasible for only the smaller shank type hooks. The second type pivots vertically in the C-shaped section of the hook from a rib or boss that is located in the stem just above the C-shaped section of the hook. The free end of the latch is spring biased against the opposite end of the C-shaped section but generally below the tip of the hook. U.S. Pat. No. 3,827,746 to Byers shows a latch of this second type which purports to extend along its upper edge in a substantially straight line from the stem to the tip of the hook; however, Byers shows a somewhat complicated mechanism for locking the latch in the closed position by engaging holes at the sides of the tip.

SUMMARY OF THE INVENTION

The present invention provides a hook latch for mounting on both small and large conventional eye type or shank type hoisting hooks. The latch is pivotally connected at one end to the stem of the hook for pivotal movement towards and away from the body portion of the hook about a horizontal pivot axis perpendicular to and spaced from the central vertical axis of the stem. The tip of the hook is provided with a recess means facing the mouth of the hook and terminating in a stop means. The latch which extends longitudinally away from the stem has a projection means on the free end thereof adapted to be received in the recess means in the tip. A spring means is provided for urging the latch away from the body portion of the hook towards and into engagement with the tip whereby the projection means will engage the stop means. A rotatable locking means is also mounted at the free end of the latch and is selectively engagable with the upper end of the tip for retaining the latch in a closed position with respect to the hook. The latch is also provided with rear extensions having notches therein which will permit the latch to be held in open position by means of a rod which is inserted between the stem and the notches.

BRIEF DESCRIPTION OF THE DRAWINGS

FIG. 5 is a fragmentary elevation, on an enlarged scale and with certain parts in section, of the hook latch shown in FIG. 1;

FIG. 6 is an elevation of the latch taken at right angles to FIG. 5;

FIG. 7 is a sectional view taken along section line 7—7 of FIG. 6;

FIG. 8 is a fragmentary elevation of the lower portion of FIG. 6, but showing the latch in an unlocked position;

FIG. 9 is a side elevation taken at right angles to FIG. 8;

FIG. 10 is an end elevation taken at right angles to FIG. 8;

FIG. 11 is a view similar to FIG. 8 showing the latch in an intermediate position between those of FIGS. 6 and 8;

FIG. 12 is a side elevation taken at right angles to FIG. 11; and

DETAILED DESCRIPTION OF THE PREFERRED EMBODIMENT

Figure 1:
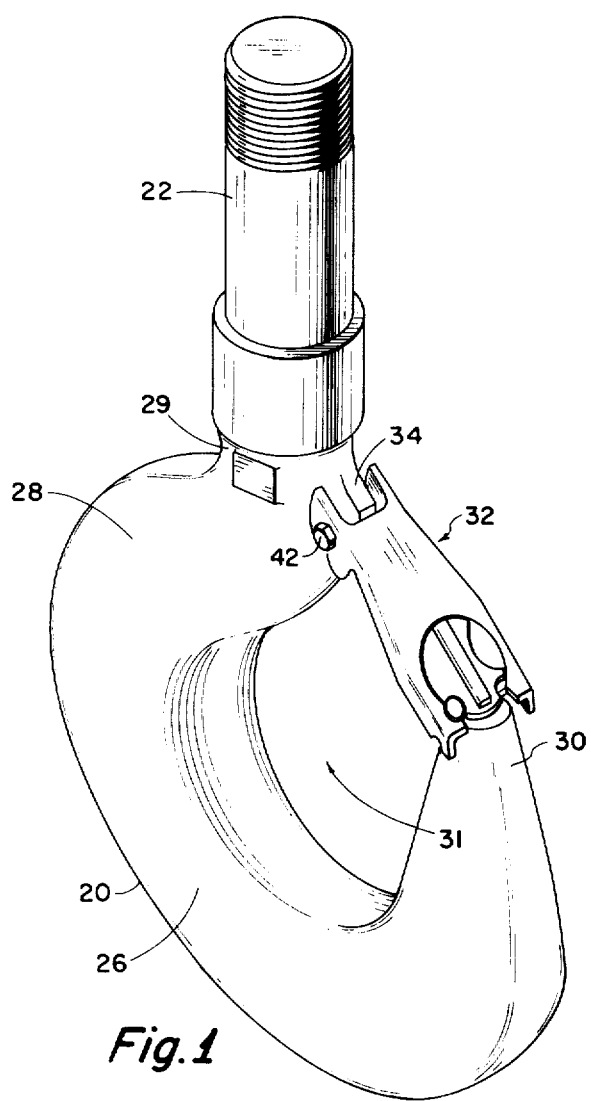
FIG. 1 is a view in perspective of a shank type hoisting hook provided with a hook latch constructed in accordance with the present invention and showing the hook latch in a locked position.
Figure 2:
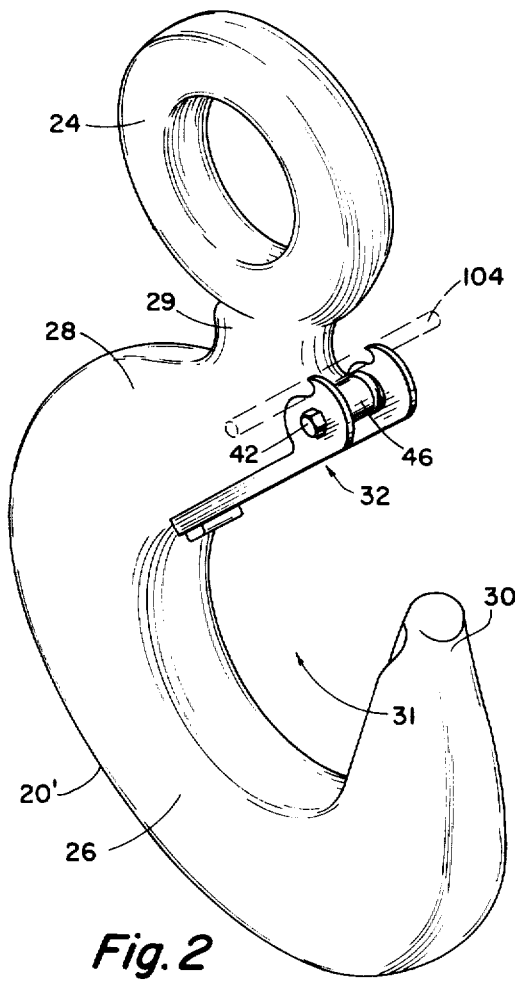
FIG. 2 is a view in perspective of an eye type hoisting hook provided with the same type of hook latch shown in FIG. 1 but showing the hook latch in an open position.

Referring to the drawings in detail, FIG. 1 shows a shank type hoisting hook 20 having a threaded shank 22 attached at the upper end of the hook. In FIG. 2 there is shown an eye type hoisting hook 20' with an eye or ring 24 attached thereto. Each hook (20 or 20' ) has a C-shaped body portion connected at one end to a curved back portion 28 and terminating at its opposite end with an upwardly and outwardly curved tip 30. The back portion 28 of the hook 20 shown in FIG. 1 connects with the threaded shank 22 by means of a stem 29. The curved back portion 28 of the hook 20' of FIG. 2 connects with the eye or ring 24 by means of the stem 29. The interior of each hook is, therefore, defined by a mouth 31.

Figure 3:
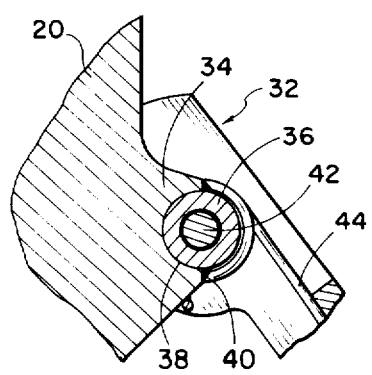
FIG. 3 is a fragmentary sectional view through the latch attachment area of FIG. 1 and illustrating a weld type mounting.

A latch 32, to be described hereinafter in greater detail, is designed to cover over the mouth 31 of the hook and extend in a substantially straight line from the stem 29 to the upper end of the tip 30. In the case of FIG. 1, the hook therein is provided with a rib 34. A collar or bushing 36 (see also FIG. 6) is placed within a circular recess 38 in the rib 34 and welded to the rib by means of welding 40. A bolt 42 which passes through the bushing 36 also passes through the end of the latch 32 to provide a substantially horizontal pivot axis for the latch 32, as will hereinafter appear. A spring 44 wound around the ends of the collar 36 and having forwardly projecting portions is adapted to urge the latch 32 in a counterclockwise direction (referring to FIG. 3).

Figure 4:
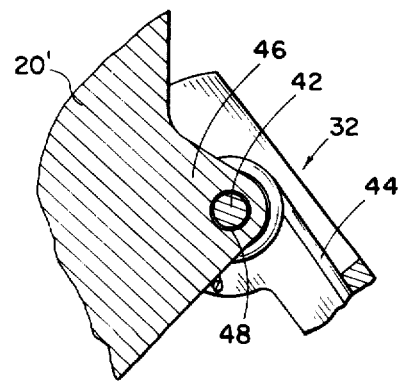
FIG. 4 is a fragmentary sectional view through the latch attachment area of FIG. 2 and illustrating a bolt type mounting.

The hook 20' shown in FIG. 2 is shown as being provided with a boss 46. (It is sometimes conventional to provide a hoisting hook with a rib such as the rib 34 shown in FIG. 1 or a boss such as boss 46 shown in FIG. 2.) At any event, as best shown in FIG. 4, the boss 46 is merely provided with a horizontal hole 48 therethrough. The bolt 42 is inserted through the hole 48 and through the ends of the latch 32 to provide a substantially horizontal pivot axis for the latch thereto. The spring 44 is wound around the ends of the boss 46 to urge the latch 32 in a counterclockwise direction as explained above.

Referring now to FIGS. 5 through 12, the latch 32 can be considered generally as comprising an upper flat portion 50, and side members 52 and 54 projecting downwardly at right angles to the flat portion 50. The side members 52 and 54 are provided with rearwardly projecting ears 56 and 58, respectively, in which the holes are located through which the bolt 42 passes to provide the pivotal connection referred to above. The ears 56 and 58 are also provided with notches 60 for a purpose which will hereinafter appear.

Figure 13:
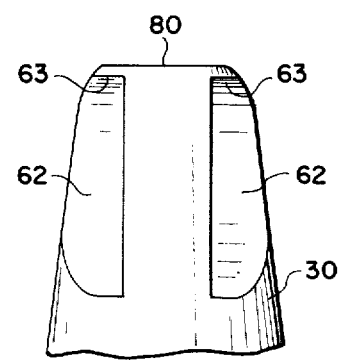
FIG. 13 is a fragmentary elevation, on an enlarged scale, of the tip of the hook as it would appear looking outwardly from the mouth of the hook.

FIG. 5 shows that the tip 30 of the hook (see also FIG. 13) is provided with a pair of upwardly and outwardly extending recesses or notches 62 on the side of the tip towards the mouth. These notches 62 terminate at their upper ends in a pair of upwardly and inwardly directed stops or flanges 63. On the underside of the flat body portion 50 is provided a pair of spaced projections 64 adjacent the forward end of the body portion 50. These projections 64 will pass into the notches 62 when the latch 32 is moved to the closed position shown in FIG. 5. The projections 64, however, will not pass beyond the position shown in FIG. 5 because the ends of these projections will contact the stops 63 at the upper ends of the notches 62, thereby preventing further upward movement of the latch 32.

A rotatable disc 66 is rotatably mounted in a countersunk and flat circular recess 68 in the forward end of the flat body portion 50. As best shown in FIGS. 5 and 7, the flattened recess portion 68 is provided with a hole 70 through which the shaft 72 passes. Shaft 72 is attached to, or part of, the disc 66 and provides the axis of rotation for the disc. A collar 74 is received on the end of the shaft 72 on the oposite side of the flat portion 68 from the disc 66. The collar 74 can be welded, for example, to the shaft 72 by means of the welding 76.

Referring now to FIGS. 6, 8 and 11, the disc 66 is provided with an enlarged circular cutout portion 78. When this cutout portion 78 is in alignment with the tip 30 (represented by the position shown in Fig. 8), the latch 32 can be pivoted downwardly away from the tip 30 and towards the curved back portion 28 of the hook. However, when the disc 66 is in the FIG. 6 position, where the cutout portion 78 is out of alignment with the tip 30, then the latch 32 is in the locked position shown in FIG. 5. In the latter figure, the forward end of the disc 66 overlies the flattened end 80 of the tip 30.

For the purpose of permiting the turning of the disc 66, a rib 82 is attached to the upper surface of the disc 66 and extends diametrically across the disc. The rear or upper end of the rib 82 is tapered as at 84. Thus, when the latch 32 is in the locked position shown in FIG. 5, the tapered surface 84 and the otherwise flat top surface of the latch 32 form a smooth bridge which allows a slack load line to traverse the latch without snagging.

A locking pin 86 is provided to secure the disc 66 in its locking or unlocking position. The pin 86 passes through a hole which is located within the flat circular recess 68 at a position generally corresponding to the normal or maximum outer diameter of the disc 66. The upper end of the locking pin 86 is provided with a circular head 88 and the lower end of the pin 86 is provided with a circular base 90. A conical helical spring 92 is received on the pin 86 between the head 90 and the undersurface of the circular recessed portion 68; the effect of this spring is to urge the pin 86 downwardly or in to the position shown in FIG. 7.

The disc 66 is provided with two smaller cutout portions 94 and 96 which are substantially of the same size. Cutout portions 94 is employed to effect the locked position of the disc 66 as shown in FIGS. 5 and 6. In this position the head 88 of the locking pin 86 is received in the cutout portion 94 thereby preventing rotation of the disc 66 from the position shown in FIG. 6. When the disc 66 is in the unlocking position, as shown in FIG. 8, the head 88 of the pin 86 is now received within the cutout portion 96.

If it is desired to turn the disc 66 from the position shown in FIG. 6, to that shown in FIG. 8, it is merely necessary to apply finger pressure to the underside of the pin 86 through the base 90. For this purpose, a further cutout 98 is provided on the side member 52. This cutout portion 98 provides clearance for the finger. When the head 88 of the pin 86 is elevated above the disc, as shown in FIG. 12, it is now possible to rotate the disc in a clockwise direction until the disc 66 occupies the position shown in FIG. 8. At this time the finger pressure is relieved from the base 90 and the head 88 will be received within the cutout portion 96.

It is only possible to move the disc 66 counterclockwise beyond the position shown in FIG. 8, or clockwise beyond the position shown in FIG. 6, because the peripheral portion 100 of the disc extending between the cutout portions 94 and 96 is of reduced radius with respect to the normal outer radius 101 of disc 66. The portion 102 which connects between the smaller cutout portion 96 and the enlarged cutout portion 78 is of the same maximum radius as the outer radius 101. As best shown in FIG. 11, which represents an intermediate position of the disc 66, it will appear that the portion 100 of reduced radius just barely clears the outside of the pin 86. If one were to attempt to move the disc 66, for example, clockwise from the position shown in FIG. 8, the tip 102 would contact the pin 86 and thus preclude this attempted clockwise movement. Similarly with regard to FIG. 6, if one were to attempt to rotate the disc 66 in a counterclockwise direction from this position, the portion 101 representing the maximum outer diameter of the disc would contact the pin 86 and thereby preclude attempted counterclockwise movement of the disc.

Referring now to FIG. 2, if for any reason one would wish to hold the latch 32 in a fully open position against the curved back portion 28, a small rod, such as the rod 104 can be fitted into the notches 60 while the latch 32 is held against the body portion 28 by pushing against the action of the spring. Thereafter, when the pressure is released from the latch 32, the spring will cause the rod 104 to be urged against the stem 29, thereby holding the latch 32 in the open position shown in FIG. 2.

What is claimed is:

1. A latching mechanism for a hook of the type having a C-shaped body portion with a stem at one end of the body portion and a tip at an opposite end of said body portion spaced from said stem to form a mouth, a longitudinally extending latch pivotally connected at one end to said stem for pivotal movement towards and away from said body portion about a pivot axis perpendicular to and spaced from the central axis of said stem, said tip having a recess means therein terminating in a stop means, said latch being provided with a projection means adjacent an end opposite from said one end, whereby, when said latch is pivoted about said pivot axis away from said body portion said projection means will pass into said recess means until said projection means engages said stop means, engagement of said projection means with said stop means constituting a closed position of said latch with respect to said hook, and a rotatable locking means rotatably mounted at said opposite end of said latch for rotation about an axis substantially at right angles to said latch, said locking means being selectively disposable over and selectively engagable with the upper end of said tip for retaining said latch in said closed position with respect to said hook.

2. A latching mechanism as set forth in claim 1 wherein a spring means is provided to urge said latch away from said body portion towards and into engagement with said tip.

3. A latching mechanism as set forth in claim 2 including means for holding said latch in a fully open position against said body portion in opposition to the action of said spring means.

4. A latching mechanism for a hook of the type having a C-shaped body portion with a stem at one end of the body portion and a tip at an opposite end of said body portion spaced from said stem to form a mouth, said hook being substantially symmetrical about a vertical plane of symmetry passing through a central vertical axis of said stem and the center of said body portion, a latch defined by an upper flat portion extending from a rear end thereof to a forward end thereof, a pair of narrow side members extending downwardly from said upper flat portion adjacent the sides thereof, said side members being pivotally connected adjacent the rear end of said flat portion to said stem for pivotal movement about a pivot axis perpendicular to said plane of symmetry, said tip having a pair of spaced notches on the side of said tip towards said mouth and extending vertically upward on opposite sides of said plane of symmetry, said notches terminating at their upper ends in a pair of upwardly and inwardly directed stops, a pair of spaced projections on the underside of said flat body portion adjacent said forward end thereof and adapted to be received in said notches, spring means located along said pivot axis for urging said latch upwardly until said projections engage said stops, the forward end of said flat body portion being provided with a flattened circular recess, a disc mounted for rotation in said circular recess, an upwardly projecting rib attached to said disc and extending diametrically across said disc for manual rotation of said disc, said disc being provided with an enlarged circular cutout portion which, when aligned with said tip, will permit the downward pivoting of said latch away from said tip against the action of said spring, said enlarged circular cutout portion when moved out of alignment with said tip by the rotation of said disc will cause said disc to be disposed over said tip thereby locking said latch against said tip.

5. A latching mechanism as set forth in claim 4 wherein said disc is provided with a first smaller cutout portion adjacent said enlarged cutout portion and a second smaller cutout portion circumferentially spaced on said disc with respect to said first smaller cutout portion, the periphery of said disc extending between said smaller cutout portions being of smaller radius than the remaining outer radius of said disc, said latch being provided with a hole in said flattened circular recess adjacent the forward end thereof, a locking pin slideably mounted in said hole and having a circular head at the upper end thereof adapted to be received selectively in either of the two smaller circular cutout portions when aligned with said head, said locking pin being provided with a circular base at the end of said pin opposite from said head, spring means received on said pin between said base and the underside of said upper flat portion for urging said pin downwardly, whereby, when said locking pin is urged upwardly so that the head thereof is above said disc, said disc can be rotated from a first position where one of said smaller cutout portions is in alignment with said head to a second position where the other smaller cutout portion is in alignment with said head, the location of said hole and diameter of said pin being so related to the position of said disc that the peripheral portion of smaller radius can pass beyond said pin but preventing the rotation of the periphery of said disc of the remaining outer radius beyond said pin.

* * * * *